United States Patent

Koike et al.

Patent Number: 5,837,023
Date of Patent: Nov. 17, 1998

[54] PROCESS FOR MAKING GRADIENT INDEX OPTICAL ELEMENTS

[75] Inventors: Hisashi Koike, Koganei; Yuko Morita, Akiruno, both of Japan

[73] Assignee: Olympus Optical Co., Ltd., Tokyo, Japan

[21] Appl. No.: 831,943

[22] Filed: Apr. 2, 1997

[30] Foreign Application Priority Data

Aug. 8, 1996 [JP] Japan .................................. 8-210070

[51] Int. Cl.[6] .............................. C03B 8/00; C03C 15/00; C03C 17/00; C03C 21/00
[52] U.S. Cl. ........................... 65/17.2; 65/30.1; 65/30.13; 65/31; 65/399; 65/440
[58] Field of Search ..................... 65/17.2, 30.1, 65/30.13, 31, 60.52, 111, 399, 400, 440

[56] References Cited

U.S. PATENT DOCUMENTS 5,069,700  12/1991  Yamane et al. .
5,171,344  12/1992  Noda ........................................ 65/30.1
5,439,495  8/1995  Koike et al. .

FOREIGN PATENT DOCUMENTS 60-6295   2/1985  Japan .
60-42239  3/1985  Japan .

OTHER PUBLICATIONS

Principle and Application on Gradient Index Optical Imaging, K.Nishizawa, pp. 748–758, from the Review of Loser Engineering 8 (5) 1980, See Appln. p. 4.

Communication of the American Ceramic Society Determination of Diffusion Coefficients of Dopants In Wet Gels During Leaching,K.Shingyouchi et al Feb. 1988 pp. C–82 —C–84 Also see Appln. p. 7.

Journal of non–crystalline solids 169 (1994) pp. 160 –168 Leaching Silicon–Based Wet Gels To Approach Grin, Dah–Shyang Tsai et al, Also see Appln. p. 8.

*Primary Examiner*—Peter Chin
*Assistant Examiner*—Jacqueline A. Ruller
*Attorney, Agent, or Firm*—Cushman Darby & Cushman IP Group of Pillsbury Madison & Sutro LLP

[57] ABSTRACT

The invention provides a process for making a gradient index optical element having a precisely parabolic configuration of refractive index profile. After a concentration profile is imparted across a gel prepared by a sol-gel technique, the concentration profile is fixed. In this case, the treatment with a concentration profile-fixing solution is carried out at a temperature higher than that at which the treatment with a concentration profile-imparting solution is carried out, whereby the rate of fixing the concentration profile is so higher than that of imparting the concentration profile, so that any possible deformation of the concentration profile formed at the concentration profile-imparting step is reduced or inhibited.

21 Claims, 4 Drawing Sheets

PROCESS FOR MAKING GRADIENT INDEX OPTICAL ELEMENTS

BACKGROUND OF THE INVENTION

The present invention relates to a process for making a gradient index optical element by a sol-gel technique, which is applicable to optical elements for cameras, microscopes, endoscopes, etc.

Glass making by the sol-gel technique is basically carried out by hydrolyzing a glass skeleton-forming silicon alkoxide using ethanol or other solvent in the presence of hydrochloric acid or other catalyst to prepare a sol, converting the sol into a wet gel by polycondensation, drying the wet gel to remove the solvent from within wet gel pores, and firing the dried gel into a densified glass. When gradient index optical elements are produced by the application of the glass making process by the sol-gel technique, a step of incorporating a metal component in the gel with a certain concentration profile is needed in addition to the aforesaid basic steps.

To make, for instance, a gradient index optical element having convex lens action such that the refractive index decreases continuously from the center to the periphery thereof, a metal component contributing greatly to the refractive index thereof is first incorporated in the gel. The incorporation of the metal component in the gel may be achieved by two processes, one wherein the sol is gelled upon the metal component added thereto, and the other wherein the gel is prepared, and then impregnated with the metal component by dipping it in a metal component-containing solution.

The metal component incorporated by these processes in the gel is then dipped in a treating solution capable of eluting the metal component or otherwise treated to impart a concentration profile to the metal component. For the metal component added to the gel, metal alkoxides or their derivatives, and metal salts may be used.

Among known processes using a metal alkoxide or its derivative as the starting material for the metal component, there is a process described in JP(A)6042239. According to this process, the metal alkoxide added for sol preparation forms a chemical bond such as —Si—O—M—O—Si— where M is a metal component during gelation, which is in turn entrained in the gel as a part of the skeleton as is the case with silica. Upon this bond severed, the gel is dipped in an acid or other solution capable of selectively eluting the metal component to impart a concentration profile to the metal component. The metal component added as the metal alkoxide to the sol may be selectively eluted by making use of hydrochloric, nitric, or other acid. The gel with the concentration profile imparted to it is dipped in methanol or other organic solvent for the purpose of stopping the formation of the concentration profile, so that the gel is washed for acid removal while the profile is fixed. This gel is dried, and fired into a gradient index optical element.

However, one problem with a metal alkoxide is that its handling is awkward because its reactivity to water is generally high. Another problem is that difficulty is involved in the doping of the gel with much metal alkoxide because the metal alkoxide has a limited solubility.

When a metal salt is used as the starting material for the metal component, on the other hand, glasses can be made over a wide composition range and with ease, because use may be made of numerous materials that are chemically stable yet inexpensive, and have a relatively high solubility. U.S. Pat. No. 5069700 (JP(B)94008179) discloses a process comprising the steps of gelling a sol obtained by the hydrolysis of a solution composed mainly of a silicon alkoxide and a metal salt, and dipping the gel in a solution in which the metal salt has a low solubility, thereby precipitating out metal salt crystallites in the gel.

When the metal salt is added to the sol prior to gelation, it is used in the form of an aqueous or alcohol solution in which the metal salt is dissolved in water or alcohol. In this case, the metal component remains dissolved in the solvent in the gel skeleton, and so is likely to migrate and diffuse as the solvent migrates and diffuses within the gel skeleton. It is thus possible to obtain a gradient index optical element by dipping the gel in a solvent in which the metal salt has a low solubility so that the metal component is precipitated out in the form of crystallites of the metal salt, which are in turn fixed in the gel skeleton, and drying, and firing the gel into a lass.

When the thus made gradient index optical element is used as an optical lens for cameras, microscopes, endscopes or the like, use is made of the bending of light rays in the medium of the gradient index optical element. By control of refractive index profile configuration it is possible to make correction for various aberrations. In general, it is theoretically preferable that the refractive index profile configuration needed for the effective condensation of light rays includes terms of higher order in addition to a square term when the value of a refractive index with respect to radius is expressed by a polynomial. However, the degree of the terms of higher order is much smaller than that of the square term; in other words, for actual lens design, only a square distribution need be considered. It is thus desired to make a gradient index optical element having a substantially parabolic configuration of refractive index profile. See *The Review of Laser Engineering*, 8, (5), p. 748 (1980).

The refractive index profile configuration depends on a composition profile configuration of the metal component added. In order to make a gradient index optical element having an effective refractive index profile configuration, therefore, it is of vital importance to place the composition profile configuration of the metal component added under precise control.

With conventional processes, however, it is difficult to make a gradient index optical element having a parabolic configuration of refractive index profile. This is believed to be because a parabolic configuration of metal composition profile obtained at the concentration profile-imparting step is not firmly fixed by a profile-fixing treatment, and so is deformed due to re-diffusion. In other words, when the gel starting from the metal salt is dipped in a concentration profile-imparting solution for the formation of a composition profile, viz., a solution in which the metal component has a high solubility, the liquid present in gel pores is replaced by the profile-imparting solution in which the metal component has a high solubility. When, in this state, the gel is dipped in a concentration profile-fixing solution in which the metal component has a low solubility for the purpose of fixing the formed profile configuration, the concentration profile-fixing solution penetrates from the periphery to the center of the gel, so that fixation can occur in order from the periphery of the gel.

Since the concentration profile-fixing solution diffuses gradually from the periphery to the center of the gel, the fixation of the metal component starts from the periphery of the gel at an initial stage of the fixation of the concentration profile. At the center of the gel where the concentration profile-imparting solution in which the metal salt has a high solubility remains, however, the formation of the profile continues, so that there is a difference in the degree of formation of the concentration profile between the periphery and the center of the gel.

With the elapse of time, the concentration profile-fixing solution arrives at the center of the gel, so that the concentration profile is fixed even at the center of the gel to some extent. Thus, the refractive index profile of the finally obtained gradient index optical element is in a centrally deformed configuration as shown by a solid line in FIG. 1. Such an optical element cannot effectively condense light rays, and so is unsuitable for actual applications.

The same also holds when the metal alkoxide is used as the metal component. That is, when the gel is dipped in alcohol for the purpose of stopping the formation of the concentration profile, there is a time lag in the penetration of the stopping solution between the periphery and the center of the gel. Likewise, the formation of the profile proceeds at the center of the gel, yielding a centrally deformed profile configuration.

To achieve a parabolic configuration of refractive index profile, U.S. Pat. No. 543945 (JP(A)07010551) discloses a process wherein an organic acid or other substance capable of generating the same anions as those of a metal salt added to a gel is added to a profile-imparting solution for equilibrium control, thereby preventing any possible deformation of a concentration profile configuration formed by using the metal salt as a starting material.

With this process, however, it is difficult to preset conditions for the type, amount and such like of the organic acid used, although depending on the type, amount and such like of the concentration profile-imparting metal species used. Furthermore, this process is not applicable to processes using metal alkoxides as the starting material for the metal component.

JP(B)8506295 discloses a process comprising the steps of dipping a porous glass impregnated with a metal salt in a solution capable of eluting a metal component to impart a concentration profile thereto, and dipping the glass in a solvent, in which the metal component has a low solubility and which is maintained at around 0° C., for the purpose of stopping, and fixing the formation of the profile. However, the rate of penetration of the profile-fixing solvent into the gel becomes slow due to a viscosity increase of the solvent, and a lowering of the rate of diffusion of the metal component. In this process, therefore, the effect on the fixation of the profile due to a drop of solubility becomes slender, resulting in the progress of formation of the profile in the vicinity of the center of the gel, and so yielding a centrally deformed profile configuration.

Concentration profile-imparting solutions used for imparting concentration profiles to gels prepared by the sol-gel technique differ in diffusion coefficient although depending on the type of the metal to be eluted, and the type of profile-imparting solutions used. Referring here to J. Am. Ceram. Soc. 71, 2, C-82-C-84 (1988), a diffusion coefficient for the elution of Ti, and Ge is found by the immersion in hydrochloric acid or water of $SiO_2$—$TiO_2$, and $SiO_2$-$GeO_2$ gel systems prepared by using metal alkoxides as starting materials. J. Non-Crystalline Solids, 169 (1994), pp. 160–168, refers to a profile-imparting diffusion coefficient. In this case, profiles are imparted to SiO2—BaO, and $SiO_2$—$TiO_2$ wet gel systems by dipping them in a mixed ethanol-water solvent, and hydrochloric acid, respectively, to elute Ba, and Ti, and these wet gel systems are then severed to measure the concentration of barium, and titanium.

However, these publications, albeit making investigation of profile behaviors using diffusion coefficients, fail to teach any profile-imparting method suitable for the achievement of a refractive index profile for a practical level of gradient index optical elements.

An object of the present invention is to provide a process for making a gradient index optical element by a sol-gel technique, which can solve the problem that when a gel is provided with a concentration profile of a metal component contributing to a refractive index profile, it is impossible to impart any precise concentration profile to the gel, because a concentration profile-fixing rate differs between the center and the periphery of the gel after the concentration profile has been imparted to the gel.

SUMMARY OF THE INVENTION

According to one aspect of the present invention, there is provided a process for making a gradient index optical element characterized in that at a step of fixing a concentration profile of a metal component after the concentration profile of the metal component has been imparted to a gel prepared by a sol-gel technique, the rate of fixing the concentration profile of the metal component is faster than the rate of forming a concentration profile across the metal component.

In the aforesaid process for making a gradient index optical element, it is preferable that the rate of diffusion of a concentration profile-fixing solution in the gel is faster than that of a concentration profile-imparting solution in the gel.

In the aforesaid process for making a gradient index optical element, it is preferable that the temperature of the concentration profile-fixing solution is higher than that of the concentration profile-imparting solution.

In the aforesaid process for making a gradient index optical element, it is preferable that the viscosity of the concentration profile-fixing solution is lower than that of the concentration profile-imparting solution.

According to another aspect of the present invention, there is provided a process for making a gradient index optical element having a composition profile by a sol-gel technique, wherein at a step of imparting a concentration profile of a metal component across a gel, a diffusion coefficient in the gel of the metal component contained in the gel is up to $5 \times 10^{-7}$ $cm^2$/sec., upon the gel dipped in a acid- or metal salt-containing solution.

According to yet another aspect of the present invention, there is provided a process for making a gradient index optical element having a composition profile by a sol-gel technique, wherein at a step of imparting a concentration profile of a metal component across a gel, the gel is dipped in a liquid in which the metal component contained in the gel has a solubility equal to or lower than $5 \times 10^{-3}$ mol/l and equal to or more than $1 \times 10^{-4}$ mol/l.

In the aforesaid processes of making a gradient index optical element, it is preferable that when a metal salt is used as a starting material for the metal component, a mixed treating solution comprising at least two solvents, which are selected from the group consisting of water, alcohols, glycols, ethers, ketones, saturated hydrocarbons such as hexane, and esters, and in which the metal salt is dissolvable with a different solubility, is used as the concentration profile-imparting solution.

DESCRIPTION OF THE PREFERRED EMBODIMENT

Figure 1:
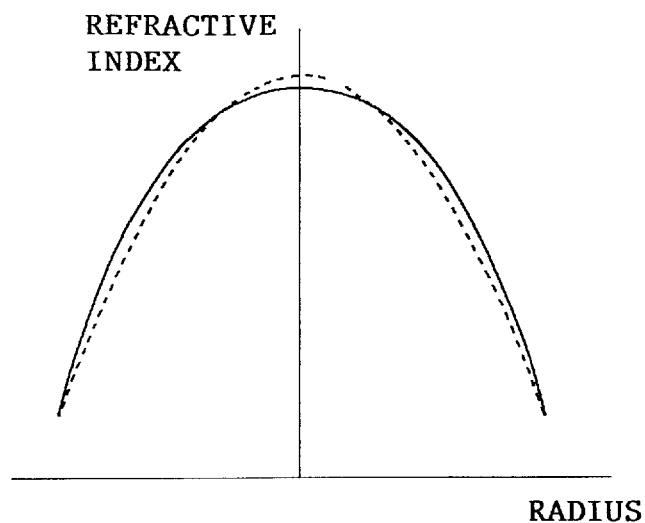
FIG. 1 illustrates conventionally obtained refractive index profiles.

The present invention provides a process for making a gradient index optical element having an enhanced optical effect, wherein when a refractive index profile is formed by a sol-gel technique, a parabolic configuration of refractive index profile formed by a concentration profile-imparting treatment is fixed to prevent any deformation thereof.

Since a gel has a certain volume, it is substantially impossible to completely reduce to zero a time taken for the penetration of a profile-fixing solution to the center of the gel. Especially when making a gradient index optical element having a large aperture, the deformation of a concentration profile is likely to occur due to a large time lag in the initiation of profile fixation between the periphery and the center of the gel, because some considerable time is taken for the penetration of the fixing solution to the center of the gel.

Here consider the rates of formation and fixation of the concentration profile, although it is required to take account of the accuracy of a refractive index profile configuration that is actually demanded in view of design. A specific condition is then determined to prevent any substantial deformation of the concentration profile configuration throughout the process of the penetration of a concentration profile-fixing solution to the center of the gel. This specific condition is typically determined by:

(1) making the rate of formation of the concentration profile low, (2) making the rate of fixation of the concentration profile high, and (3) achieving the above (1) and (2) at the same time.

Reference is first made to case (1) where the rate of formation of the concentration profile is slow with the proviso that the metal component is added as a metal salt to the gel. When the gel is dipped in a solution in which the metal salt has a low solubility at the profile-fixing step, the time taken for the fixing solution to arrive at the center of the gel is invariable. However, the profile configuration formed at the center of the gel due to the resulting time lag is little likely to be deformed. Thus, the concentration profile configuration obtained upon the completion of the concentration profile-imparting step is fixed and kept substantially intact, so that a parabolic configuration of concentration profile can be achieved.

The same also holds for the addition to the gel of the metal component in an metal alkoxide form. The concentration profile is formed with an acid or the like, and the formation of the concentration profile is stopped by washing the concentration profile-imparting solution with alcohol or the like to fix the concentration profile configuration. If, in this case, the rate of formation of the concentration profile is slow, the concentration profile configuration obtained upon the completion of the concentration profile-imparting step is fixed and kept substantially intact throughout the process of penetration of the concentration profile-fixing solution or alcohol to the center of the gel, so that a parabolic configuration of concentration profile can be achieved.

In case (2), too, the rate of fixation of the concentration profile is increased, whereby the fixation of the concentration profile can be carried out simultaneously with the passing of the concentration profile-forming step to the fixation step. Throughout the progress of profile fixation, therefore, the formation at the center of the gel of the concentration profile by the remaining concentration profile-imparting solution is substantially inhibited, thereby making it possible to achieve a parabolic configuration of concentration profile that undergoes no deformation.

In case (3) where the low rate of formation of the concentration profile is used in combination with the high rate of fixation of the concentration profile, the effects of cases (1) and (2) are concurrently achievable so that a gradient index optical element having a parabolic configuration of profile can most effectively be made.

In cases (2) and (3), too, the same effect as mentioned above is achievable irrespective of whether the starting metal component is a metal salt, or a metal alkoxide or its derivative, as in case (1). By use of these processes a parabolic configuration of refractive index profile formed by the profile-imparting treatment can be fixed and kept intact; that is, it is possible to make a gradient index optical element having a profile configuration that is effective in view of optical design.

The concentration profile-imparting and fixing treatments are carried out by dipping the gel in a desired treating solution to penetrate the solution into the gel, and so the treating rate correlates with the rate of penetration of the treating solution into the gel. When the rate of diffusion of the concentration profile-imparting solution into the gel is lower than the rate of penetration of the profile-fixing solution into the gel at the next concentration profile-fixing step, the profile is most unlikely to deform.

More specifically, the profile-imparting solution which penetrates into the gel just before the completion of the concentration profile-imparting step is present on or around the periphery of the gel. If, at the next step, the rate of penetration of the profile-fixing solution into the gel is higher than the rate of diffusion of the profile-imparting solution into the gel, the profile-fixing solution is replaced by the profile-imparting solution, and so arrives at the center of the gel before the profile-imparting solution present on the periphery of the gel arrives at the center of the gel. For this reason, it is possible to effectively fix the profile configuration prior to the deformation of the profile configuration at the center of the gel.

To make large the difference between the rate of diffusion of the concentration profile-imparting solution and the rate of diffusion of the concentration profile-fixing solution according to the process of the present invention, a difference may be established between the temperatures of the concentration profile-imparting and -fixing solutions, thereby increasing the rate of diffusion of the concentration profile-fixing solution into the gel. Alternatively, the deformation of the profile configuration may be prevented by making the profile formation slow.

That is, the concentration profile configuration can effectively be fixed by making the profile-fixing rate higher relative to the profile-imparting rate, so that the concentration profile configuration obtained upon the formation of the concentration profile can be fixed and kept intact.

When the concentration profile-imparting solution is kept at a certain temperature, the fixation of the profile can be promoted by making the temperature of the concentration profile-fixing solution higher than that temperature. As the temperature rises, the rate of diffusion of the concentration profile-fixing solution into the gel increases, resulting in the promotion of penetration of the solution into the gel. This in turn makes the rate of the profile-fixing solution so high that the concentration profile configuration can be fixed and kept intact.

When the concentration profile-fixing solution is kept at a certain temperature while the rate of diffusion of the concentration profile-fixing solution into the gel is kept constant, it is preferable to make the temperature of the concentration profile-imparting solution lower than that temperature, because the profile-forming rate can be lowered due to a solubility drop, so that the profile-fixing rate can be made relatively higher than the profile-forming rate. It is thus possible to prevent the deformation of the profile configuration which may otherwise be caused in the process of diffusion of the concentration profile-fixing solution into the center of the gel, thereby fixing the profile configuration in an effective manner.

In other words, while the concentration profile-fixing solution arrives at the center of the gel from outside, the configuration of the profile in the vicinity of the center of the gel is deformed under the influence of the concentration profile-imparting solution remaining in the vicinity of the center of the gel. However, if the concentration profile is imparted to the gel at a lower temperature, it is then possible to reduce the degree of such deformation due to a lowering of the profile-forming rate.

If the concentration profile-imparting step is effected at a temperature that is sufficiently low but high enough to prevent the solidification of the profile-imparting solution and the concentration profile-fixing step is carried out at a temperature that is sufficiently high but low enough to prevent the boiling of the profile-fixing solution, the configuration of the profile can most effectively be fixed and kept intact.

When a metal salt is used for the metal component, it is preferable that the concentration profile-imparting solution used is reduced in terms of the temperature dependence of solubility of the metal salt therein; in other words, it is not preferable to use a treating solution in which the metal salt is drastically dissolved with temperature increases, because it causes the re-diffusion of the metal component. When a metal alkoxide or its derivative is used as the starting material for the metal component, too, the configuration of the profile can effectively be fixed by lowering the concentration profile-forming rate and increasing the concentration profile-fixing rate through diffusion rate control by temperature changes.

The metal alkoxide is not substantially dissolved in the concentration profile-fixing solution such as alcohol, which is used for the fixation of the concentration profile of the gel made of the metal alkoxide, and so it is unnecessary to take account of a solubility increase due to temperature increases. If the concentration profile-imparting step is carried out at a temperature that is sufficiently low but higher than the freezing point of the treating solution, it is then possible to lower the profile-forming rate in an effective manner, and if the concentration profile-fixing step is performed at a temperature that is sufficiently high but lower than the boiling point of the treating solution, it is then possible to promote the concentration profile-fixing rate. If, in this case, the treating solution is used under reduced pressure to elevate its boiling point, it is then possible to carry out this step at much higher temperatures.

Alternatively, to make the concentration profile-fixing rate higher than the concentration profile-imparting rate may be achieved by making the viscosity of the concentration profile-fixing solution lower than that of the concentration profile-imparting solution, thereby relatively increasing the rate of penetration of the profile-fixing solution into the gel and so making use of the fixation of the profile.

When the metal salt is used for the metal component added to the gel, the concentration profile-imparting solution used may be a solvent which has a viscosity of at least 0.5 cP, and which is high in terms of the solubility of the metal salt therein. More specifically, use is made of a lower alcohol or water. Such a solvent has a relatively high viscosity; for instance, the viscosity of water, methanol, and ethanol is of the order of 1.0019 cP, 0.5945 cP, and 1.17 cP, respectively. Thus, if a low-viscosity solvent is selected for the concentration profile-fixing solution, it is then possible to achieve the fixation of the concentration profile in an effective manner because the rate of penetration of the profile-fixing solution into the gel becomes high.

Alternatively, the fixation of the profile can effectively be achieved by use of solvents of up to 0.5 cP in viscosity, for instance, acetone of 0.316 cP, diethyl ether of 0.2448 cP, hexane of 0.307 cP, and ethyl acetate of 0.449 cP. Also effective for the fixation of the profile is a mixture of such solvents which is prepared according to desired conditions while other physical properties thereof, for instance, the solubility of the metal salt, etc. therein, boiling points thereof, etc. are taken into consideration. Even a solvent of lower viscosity—which, when used alone, causes the precipitation of the metal salt due to too low a solubility of the metal salt therein—may be used in the form of a mixture with other solvent such as alcohol which is high in terms of the solubility of the metal salt therein, provided that the mixture has a viscosity that does not exceed 0.5 cP.

While it is difficult to determine general conditions compatible with various systems differing in skeleton structures, gel states such as pore diameters, the metal species added, the configuration of profiles imparted thereto, etc., it is effective to make selections from solvent systems while taking account of not only the aforesaid temperature or viscosity but also other physical properties such as polarity, and molecular volume.

According to the process of the present invention, a gradient index optical element with a well-defined concentration profile can be obtained by dipping a gel in an acid or metal salt-containing solution while the diffusion coefficient of a metal component M contained in the gel, as determined in the gel, is $D \leq 5 \times 10^{-7}$ cm$^2$/sec. Preferably $D=1\times10^{-9}$ to $5\times10^{-7}$ cm$^2$/sec., and more preferably $D=1\times10^{-8}$ to $5\times10^{-7}$ cm$^2$/sec.

$D>5\times10^{-7}$ cm$^2$/sec. is not preferable, because when the gel is dipped in the concentration profile-fixing solution, the diffusion migration of the metal component M in the profile-imparting solution remaining at the center of the gel becomes remarkable during the process wherein the concentration profile-fixing solution penetrates completely into the gel, and so no well-defined convex or concave refractive index profile can be obtained.

The diffusion of a metal component in a gel may be simulated according to diffusion equation (1). For details of this diffusion, see J. Am. Ceram. Soc., 71, (2) C-82 (1988).

$$dC/dt=(1/r)d/dr(rD\ dC/dr) \quad (1)$$

where C is the concentration of the metal component, D is a diffusion coefficient in cm$^2$/sec., t is a dipping time in sec., and r is a radial position of the gel.

A solution to this diffusion equation is given by $$(C-C_0)/(C_1-C_0)=1-2\Sigma\exp(-\alpha_n{}^2Dt/r_0{}^2)J_0(\alpha_n r/r_0)/\alpha_n j_0(\alpha_n) \quad (2)$$

$$T=D\cdot t/r_0{}^2 \quad (3)$$

Figure 7:
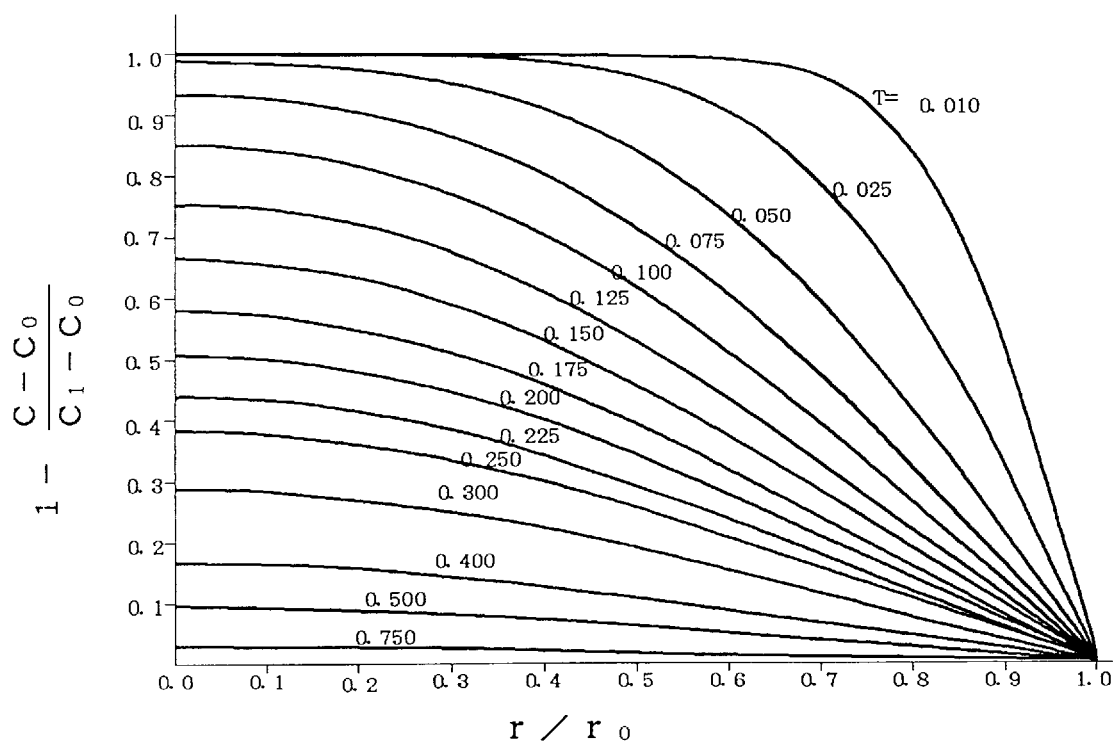
FIG. 7 illustrates the results of concentration profile-imparting simulation according to a diffusion equation.

Upon plotting with respect to T, there is obtained such a graph as shown in FIG. 7, which illustrates how the concentration profiles change with the elapse of time. To find the diffusion coefficient D according to the present invention, a change of profile configuration with the elapse of time is determined by experimentation, and judgment is passed on which stage of FIG. 7 corresponds to an actual profile time, thereby finding the value of T. Then, the value of T is substituted together with the dipping time and gel radius in equation (3).

Alternatively, a change-with-time of the concentration of the metal component in the treating solution upon the metal component dipped in it is measured, so that the diffusion coefficient D can be calculated from the amount of the metal component eluted and the size of the gel. By determining a change-with-time of the concentration in a certain solution of a metal component to which a given concentration profile is to be imparted, or measuring the amount of the metal component eluted in a dipping solution in which the gel is dipped, it is possible to make selections from treating solutions allowing the diffusion coefficient of the metal component to have a desired value, so that the conditions capable of achieving a substantially parabolic configuration of concentration profile can be well established.

So far, gradient index lenses have been made by sol-gel techniques using metal components having a diffusion coefficient lying within a range of $6\times10^{-7}$ to $7.5\times10^{-6}$ cm$^2$/sec. However, the optimum diffusion coefficient used in the present invention is smaller than those diffusion coefficients, and this means that the concentration profile is slowly imparted to the gel. Such a process making selective use of a profile-imparting solution that makes the concentration profile-imparting rate low is an unheard, or quite novel, process. By use of a concentration profile-imparting solution that makes the rate of diffusion of the metal component low, it is possible to obtain an optically improved refractive index profile configuration although some long concentration profile-imparting time is needed.

When the concentration profile is imparted to the gel by the elution of the metal component in the gel, it is preferable to select as the concentration profile-imparting solution a treating solution which is capable of dissolving the metal component to be eluted and which is reduced in terms of the solubility of the metal component therein as much as possible. For the elution of the starting metal alkoxide in an acid dipping solution, it is effective to use a solution having an acid concentration reduced as much as possible, provided that chemical bonds can be severed for imparting the concentration profile to the gel.

More specifically, when dipping is carried out using a concentration profile-imparting solution comprising a solvent in which the metal component M contained in the gel has a solubility of up to $5\times10^{-3}$ mol/l and at least $1\times10^{-4}$ mol/l, the deformation of the concentration profile upon fixed can be minimized so that a substantially parabolic configuration of concentration profile can be achieved. The range of $2\times10^{-4}$ to $3.2\times10^{-3}$ mol/l is preferable, and the range of $5\times10^{-4}$ to $2.8\times10^{-3}$ mol/l is most preferable.

When the solubility of the metal component M is larger than the upper limit of the aforesaid range, the metal component is capable of migrating in the gel while it remains dissolved in the concentration profile-imparting solution, because the concentration profile-imparting solution in which the metal component M has a large solubility remains at the center of the gel until the concentration profile-fixing solution penetrates completely into the gel after the gel has been dipped therein. When the solubility of the metal component M is smaller than the lower limit of the aforesaid range, on the other hand, any concentration profile is hardly imparted to the gel because the metal component M remains substantially undissolved therein. To provide the gel with a concentration profile, it is also effective to use any one solvent selected from the group consisting of solvents in which the metal component has a solubility lying within the aforesaid solubility range, for instance, alcohols, glycols, ethers, ketones, saturated hydrocarbons such as hexane, and esters.

When the metal component in the gel is replaced by the metal component in the concentration profile-imparting solution which is prepared by dissolving a metal salt in the aforesaid solvent, the concentration profile-imparting rate also varies by a change in the concentration of the metal salt dissolved in the concentration profile-imparting solution.

When, for instance, a gradient index optical element having positive refracting power is made by distributing a metal component contributing greatly to its refractive index in a gel in a convex configuration, salts of metals such as K, and Na are often incorporated in a concentration profile-imparting solution, said metal salts making a little contribution to its refractive index but having an effect on making correction for its thermal expansion coefficient. If the concentrations of these salts of metals such as K, and Na are reduced, it is then possible to make the rate of the exchange reactions involved and so the profile-imparting rate slow.

When a gradient index optical element having negative refracting power is made by distributing a metal component contributing greatly to its refractive index in a gel in a concave configuration, a metal salt making a great contribution to its refractive index is previously incorporated in a concentration profile-imparting solution, so that the metal salt is introduced into the gel from outside. Preferably in this case, a solvent in which the metal salt has a relatively high solubility in the range defined according to the present invention is selectively used as the solvent for the concentration profile-imparting solution.

This is because no sufficient dissolution of the metal salt occurs on a low solubility side of the solubility range according to the present invention, and so difficulty is involved in achieving any sufficient concave configuration. In addition, since the salts of metals such as K, and Na making a little contribution to the index of refraction have previously been incorporated in the gel, exchange reactions contrary to the aforesaid ones occur. Thus, the profile-imparting rate again varies although depending on the type and concentration of the metal salts previously incorporated in the gel.

In a choice of the solvent for the concentration profile-imparting solution, care must also be taken of the concentration of these metal salts. When the metal salt is used for the starting material for the metal component, it is preferable to use for the concentration profile-imparting solution a mixture of at least two solvents selected from the group consisting of water, alcohols, glycols, ethers, ketones, saturated hydrocarbons represented by hexane, and esters, in which the metal salt is dissolvable with a different solubility.

More specifically, mention is made of alcohols such as methanol, ethanol, n-propyl alcohol, isopropyl alcohol, and butanol; glycols such as ethylene glycol, diethylene glycol, and propylene glycol; ethers such as diethyl ether; ketones such as acetone, diethyl ketone, and methyl ethyl ketone; saturated hydrocarbons such as hexane, 2-methylpentane, dimethylbutane, and heptane; and esters such as ethyl acetate, methyl acetate, isopropyl acetate, and isobutyl acetate. It is then particularly preferable to use a mixture of at least two solvents in which the metal salt has different levels of solubility, thereby enabling fine regulation of the capability of the metal salt to be dissolved in the concentration profile-imparting solution. Thus, different types of solvents are mixed together to regulate the solubility of the metal salt to be dissolved therein, thereby minimizing the deformation of the profile, which may otherwise be caused at the next concentration profile-fixing step by a time lag in the penetration of a solution having a very small capability of dissolving the metal component therein between the periphery and the center of the gel.

When the metal alkoxide is used as the concentration profile-imparting metal component, it is advantageous to use a treating solution having a reduced acid concentration as the concentration profile-imparting solution. By use of the treating solution having a reduced acid concentration it is possible to slow down the rate of reactions for severing the bonds of an acid oxide skeleton by the acid. When the gel is dipped in the concentration profile-fixing solution such as an alcohol solution to wash away the acid from within the gel, thereby stopping the formation of the concentration profile, it is thus possible to minimize the deformation of the concentration profile at the center of the gel throughout the process wherein the concentration profile-fixing solution penetrates into the gel.

When the concentration profile-imparting solution used contains an acid-containing solution, it is generally difficult to define the concentration of the acid, because the concentration of the acid varies depending on its type, and the kind of the metal species introduced via the metal alkoxide. When the alkoxide of a metal such as titanium, tantalum, niobium, and zirconium is used, it is preferable to use a concentration of 1N or lower, and it is particularly preferable to use sulfuric, hydrochloric, and nitric acid of 0.1N or lower. When the gel is treated with the concentration profile-imparting solution having different acid concentrations, it is particularly preferable that the gel is dipped in a solution having a reduced profile-imparting capability prior to the profile-fixing treatment, so that the solvent in gel pores is converted to a solution having a reduced profile-imparting capability at the time when the gel is fed to the concentration profile-fixing treatment step.

It is not always required that the composition of the concentration profile-imparting solution be kept constant while the concentration profile-imparting step is being carried out. It is then preferable that before the concentration profile-imparting step comes to an end, the gel is dipped in a solution having a reduced acid concentration and so a reduced concentration profile-imparting capability, so that the treating solution having a reduced concentration profile-imparting capability is present in gel pores at the time when the gel is fed to the concentration profile-fixing step.

It is here to be understood that such considerations hold for not only the acid concentration but all the embodiments of the invention explained above as well. That is, a specific object of the present invention is to prevent any possible adverse influence of the concentration profile-imparting solution remaining in the gel after the gel is fed to the concentration performance-fixing step. Thus, it is preferable that the progress of formation of the concentration profile by the concentration profile-imparting solution remaining in the gel is slower than the progress of fixation of the concentration profile. To achieve the imparting of the concentration profile to the gel in an efficient manner and within a short period of time, it is preferable to predetermine the type of the concentration profile-imparting solution to be used or the condition for imparting the concentration profile to the gel in such a way that at an early stage of the concentration profile-imparting step the formation of the concentration profile is promoted, and at a final stage of the concentration profile-imparting step the formation of the concentration profile is retarded.

More specifically, it is preferable that at an initial stage of the concentration profile-imparting step the diffusion of the concentration profile-imparting solution in the gel or the elution of the metal component from the gel in the concentration profile-imparting solution occurs rapidly, and at the next concentration profile-fixing stage the rate of diffusion of the concentration profile-imparting solution is lower than that of the concentration profile-fixing solution.

It is also preferable that the concentration profile-imparting step is carried out at a plurality of stages; at the first stage use is made of a solution which diffuses in the gel at a high rate or in which the metal component has a high solubility, and at the second stage use is made of a solution which diffuses in the gel at a low rate or in which the metal component has a low solubility.

It is further preferable that at an initial stage of the concentration profile-imparting step the viscosity of the profile-imparting solution is increased, and at a final stage of the concentration profile-imparting step the concentration of the profile-imparting solution is increased. To this end, it is preferable to change the temperature and, hence, viscosity of the solution or alter the solution itself used at the profile-imparting step.

When the concentration profile-imparting step is carried out at a plurality of different stages, it is preferable that the stage at which the concentration profile-imparting reaction progresses rapidly is maintained long and the stage at which the concentration profile-imparting reaction slows down starts just before the gel goes to the concentration profile-fixing step, thereby promoting the formation of the concentration profile. Since the formation of the concentration profile proceeds very gently just before the completion of the concentration profile-imparting step, the disorder of the concentration profile due to the remaining concentration profile-imparting solution is minimized at the next concentration profile-fixing step.

It is here to be noted that the elution of the metal component is based on chemical reactions such as the dissolution of the metal salt, and the severance of chemical bonds. It is then to be understood that the rates of these reactions are variable with reaction temperatures, and so it is advantageous to vary the profile-imparting temperature for the purpose of regulating the aforesaid dissolving power. As often experienced at low temperature, the solubility of the metal component lowers, and the severance of the bonds by the acid becomes slow. It is thus advantageous to carry out the concentration profile-imparting step at a temperature that is lower than normal temperature (25° C.) but higher than the freezing point of the liquid which is contained in the gel and in which the gel is dipped, more specifically at a temperature lying within a range of about −23° C. to about −17° C.

The process of the present invention has a particularly favorable action on a gradient index optical element with a large distance between the periphery and the center thereof, like one having a large aperture. While the foregoing explanation has been made with reference to gels prepared by the sol-gel techniques, it is to be understood that the process of the present invention is also applicable to cases where metal components are introduced in porous materials, for instance, dry gels, calcined gels, and porous glasses to impart composition profiles thereto. Furthermore, the deformation of a profile configuration in the vicinity of the center of the gel can be inhibited by making sure of the fixation of the profile; that is, a gradient index optical element with a large refractive index difference $\Delta n$ between the center and the periphery thereof can be made due to no lowering of the refractive index of the center thereof.

The present invention will now be explained more specifically with reference to examples, and comparative examples.

Example 1

Fifty (50) grams of silicon tetramethoxide $Si(OCH_3)_4$ were stirred at room temperature with 83.73 ml of ethanol and 11.48 ml of 2N hydrochloric acid for 1 hour. Added to the resulting solution was a mixed solution of 18.42 g of titanium tetra-n-butoxide $Ti(On—C_4H_9)_4$ and 83.73 ml of ethanol for a one-hour agitation. The resulting solution was stirred with 95.69 ml of a 1 mol/l aqueous solution of barium acetate and 38.28 ml/l of acetic acid for 1 hour to obtain a sol. This sol was cast in a fluorocarbon resin vessel of 9.5 mm in diameter, allowed to stand alone in a thermostat bath at 50° C. for gelling, and aged to obtained a cylindrical form of gel.

This gel was dipped in a 0.25 mol/l mixed solution of barium acetate in isopropanol and water at a 60:40 ratio, a 0.25 mol/l mixed solution of barium acetate in ethanol and methanol at a 75:25 ratio, and ethanol in the described order to precipitate barium acetate crystallites in gel pores.

For a further 16 hours, the gel was dipped in a 0.3 mol/l solution of potassium acetate in methanol maintained at 10° C., thereby imparting a composition profile to the barium component. For an additional 24 hours, the gel was dipped in acetone at 50° C. The obtained gel was dried in a dryer at 30° C., and subsequently fired to obtain a glass body with no cracks. As a result of measuring a refractive index profile of the glass body at 633 nm wavelength, the glass body was found to have a substantially parabolic configuration of profile as shown by a solid line in FIG. 2. The glass body was also found to provide a gradient index optical element having a central refractive index of 1.6493 and a peripheral refractive index of 1.6241 with $\Delta n=0.0252$. The application of this refractive index profile to a quartic even function gave the following coefficient value. The coefficient of the quartic term was very small, indicating a substantially parabolic configuration of refractive index profile.

$$N(r)=1.6493-1.2913\times10^{-2}\cdot r^2+2.0858\times10^{-5}\cdot r^4$$

Comparative Example 1

A gel was prepared as described in Example 1. Then, a gradient index optical element was made substantially following Example 1 with the exception that a concentration profile was imparted and fixed to the gel at 30° C.

Figure 2:
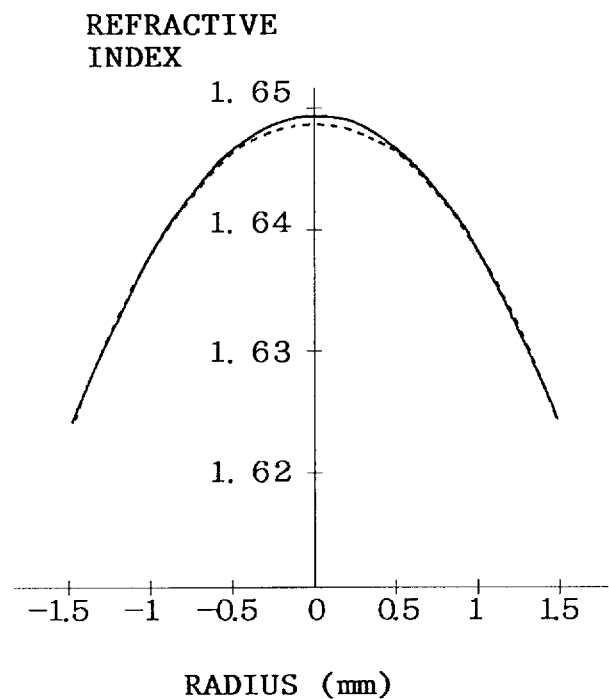
FIG. 2 illustrates refractive index profile configurations of gradient index optical elements obtained according to one example of the invention, and a comparative example.

As a result of measuring a refractive index profile of the glass body at 633 nm wavelength, the glass body was found to have a parabolic configuration of profile depressed at a center region as shown by a broken line in FIG. 2, and have a central refractive index of 1.6487 and a peripheral refractive index of 1.6241 with $\Delta n=0.0246$.

The application of this refractive index profile to the quartic even function gave the following coefficient value.

$$N(r)=1.6487-1.1051\times10^{-2}\cdot r^2-7.558\times10^{-4}\cdot r^4$$

The absolute value of the coefficient of the quartic term is larger than that in Example 1, indicating that the profile configuration departs from a parabolic configuration.

Example 2

A sol having the same composition as in Example 1 was cast in cylindrical vessels, each of 9.5 mm in diameter, thereby preparing a plurality of gels. Each gel was dipped in a 0.25 mol/l mixed solution of barium acetate in isopropanol and water at a 60:40 ratio, a mixed solution of ethanol and methanol at a 75:25 ratio, and ethanol in the described order to precipitate barium acetate crystallites in gel pores. For a further 50 hours, the gel was dipped in a 0.3 mol/l solution of potassium acetate in methanol maintained at 30° C., thereby imparting a composition profile to the barium component.

These gels were treated with the following four solutions to fix concentration profiles imparted thereto. The solubility of barium acetate in these treating solutions was nearly zero. Unless otherwise stated, the ratio is given by volume.
1. Acetone:diethetyl ether=5:5
2. Acetone:hexane=5:5
3. Acetone only
4. Acetone:isopropanol=5:5
5. Acetone:n-butanol=5:5

The viscosity of the solvents as measured independently is 0.2448 cP for diethyl ether, 0.307 cP for hexane, 0.316 cP for acetone, 2.26 cP for isopropanol, and 4.21 cP for n-butanol.

Figure 3:
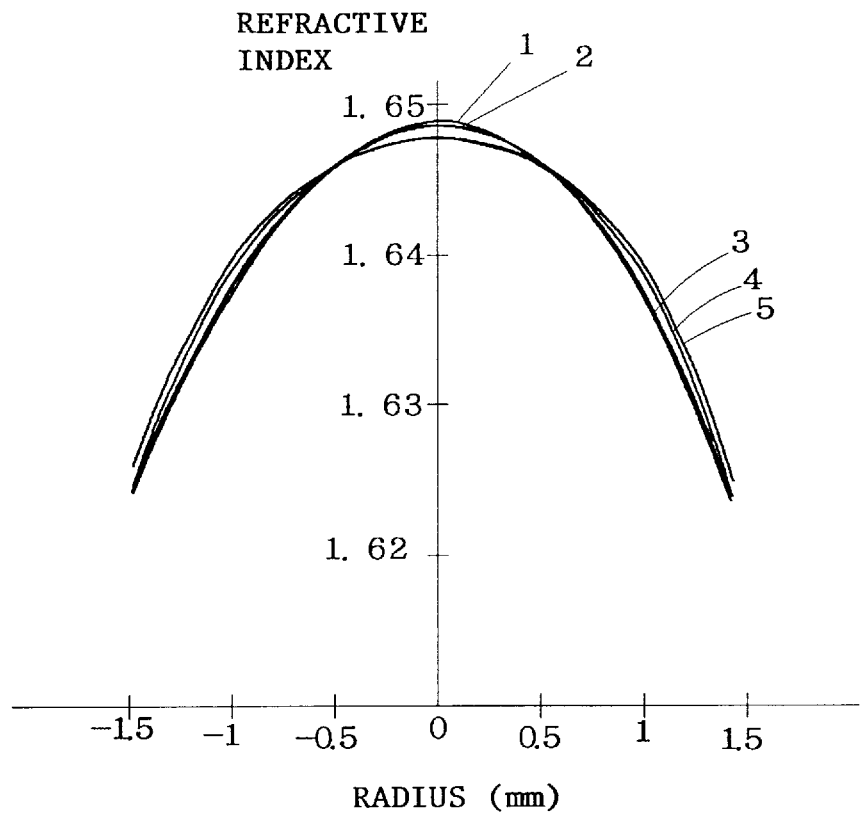
FIG. 3 illustrates refractive index profile configurations of gradient index optical elements obtained according to another example of the invention.

The solvents increase in viscosity in the order of 1 to 5. Referring to the profile configuration of the obtained gradient index optical elements, it is found that the higher the viscosity, the more is the profile deformed, as shown in FIG. 3.

The application of these refractive index profiles to the following equation gave the following coefficient values.

| $N(r) = N0 - N1 \cdot r^2 + N2 \cdot r^4$ | | |
| --- | --- | --- |
| N0 | N1 | N2 |
| 1. Acetone:diethetyl ether 1.6491 | $-1.2821 \times 10^{-2}$ | $-2.325 \times 10^{-5}$ |
| 2. Acetone:hexane 1.6489 | $-1.1971 \times 10^{-2}$ | $-3.709 \times 10^{-4}$ |
| 3. Acetone only 1.6487 | $-1.1051 \times 10^{-2}$ | $-7.558 \times 10^{-4}$ |
| 4. Acetone:isopropanol 1.6480 | $-8.1712 \times 10^{-3}$ | $-1.958 \times 10^{-3}$ |
| 5. Acetone:n-butanol 1.6478 | $-7.0710 \times 10^{-3}$ | $-2.232 \times 10^{-3}$ |

Referring to acetone:diethyl ether system (1) and acetone-:hexane system (2), the coefficient N2 of the quartic term is smaller than the coefficient N1 of the quadric term, indicating a substantially parabolic configuration of profile.

Example 3

A mixture of 50 ml of silicon tetramethoxide and 50 ml of silicon tetraethoxide was stirred with 42 ml of 0.01N hydrochloric acid at room temperature for 1 hour for a partial hydrolysis reaction. Added to the reaction product was a mixture of 180 ml of a 1.25 mol/l aqueous solution of lead acetate and 26 ml of acetic acid. After stirring was continued until the solution was mingled in a thoroughly uniform state, the sol was cast in four cylindrical vessels of 35 mm in diameter at an amount of 80 ml for each, thereby obtaining gels. Each gel was aged for 7 days in a thermostat bath at 30° C., and then dipped at 60° C. in a saturated solution of lead acetate in isopropanol:water=8:2. Whereupon, the gel was dipped in isopropanol, a mixed solvent of isopropanol:acetone=8:2 (by volume), a mixed solvent of isopropanol:acetone=5:5, and acetone in the described order.

The gel was dipped in a concentration profile-imparting solution for 40 hours, said solution being a 0.1 mol/l solution of potassium acetate in ethylene glycol, which had a viscosity of 0.25 cP, thereby imparting a concentration profile thereto. Then, the gel was dipped in n-butanol having a viscosity of 4.21 cP for 24 hours, and in acetone for an additional 24 hours, thereby fixing a concentration profile configuration.

Figure 4:
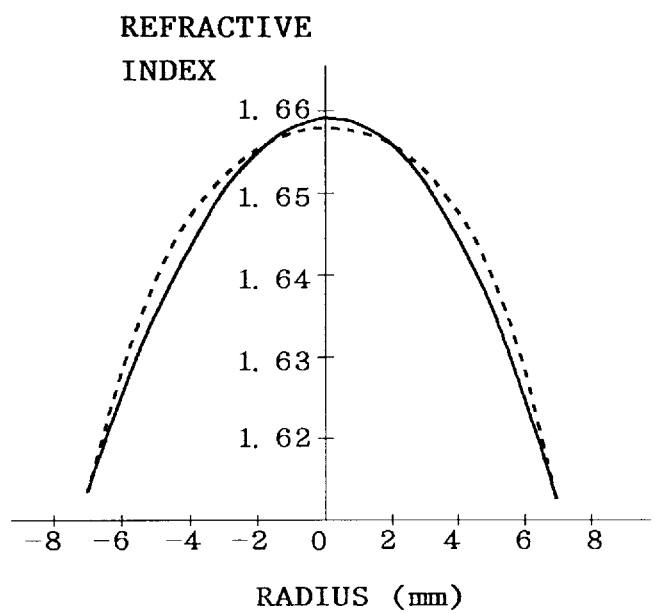
FIG. 4 illustrates refractive index profile configurations of gradient index optical elements obtained according to yet another example of the invention, and a comparative example.

This gel was dried, and then fired to obtain a gradient index optical element which had a substantially parabolic configuration of profile as shown by a solid line in FIG 4. The application of this refractive index profile to the quartic even function gave the following coefficient value.

$$N(r)=1.6590-9.6250\times10^{-4}\cdot r^2+4.350\times10^{-7}\cdot r^4$$

Comparative Example 2

A gel was prepared as in Example 3, and then dipped as in Example 3 prior to the concentration profile-imparting treatment. The gel was subsequently dipped for 40 hours in a 0.1 mol/l solution of potassium acetate in ethanol, which had a viscosity of 1.17 cP. This concentration profile-imparting time is a period of time in which the concentration of potassium acetate is on the same level as the concentration of barium acetate in the ethylene glycol solution after the concentration profile was imparted to the gel in Example 3. Then, the gel was dipped in n-butanol having a viscosity of 4.21 cP for 24 hours, and in acetone for an additional 24 hours, thereby fixing a concentration profile configuration.

This gel was dried, and then fired to obtain a gradient index optical element which had a centrally depressed and divergent configuration of profile as shown by a broken line in FIG. 4. The application of this refractive index profile to the quartic even function gave the following coefficient value.

$$N(r)=1.6587-5.3281\times10^{-4}\cdot r^2-7.690\times10^{-6}\cdot r^4$$

Example 4

Added to a mixture of 51.0 g of titanium tetra-n-butoxide and 50.5 ml of ethanol was 53.3 g of silicon tetramethoxide. After stirring was continued until a uniform solution was obtained, 25.2 ml of 1/100N hydrochloric acid were added to the solution for a hydrolysis reaction. Then, the obtained sol was cast in polypropylene vessels of 12 mm in diameter to prepare wet gels.

Figure 5:
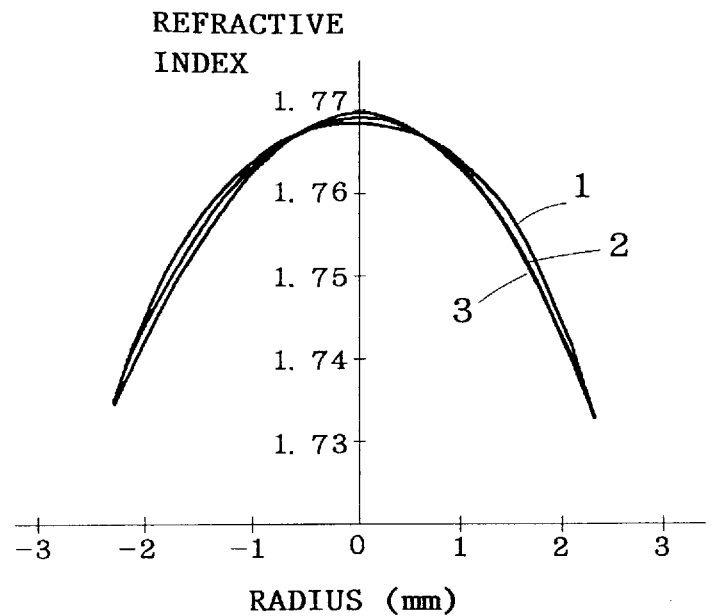
FIG. 5 illustrates refractive index profile configurations of gradient index optical elements obtained according to further examples of the invention.

Each gel was dipped in 6N hydrochloric acid to impart a concentration profile to the titanium component. The gel upon the concentration profile imparted thereto was dipped in the following solvents to stop the formation of the concentration profile, thereby fixing a concentration profile configuration.
1. 10° C. methanol
2. 30° C. methanol
3. 50° C. methanol After the fixation of the concentration profile, the gel was dried, and heated in an electric furnace into a glass, thereby obtaining a gradient index optical element. The results of measurement of diametrical refractive index profiles of the obtained glasses are shown in FIG. 5. The higher the concentration profile-fixing temperature, the closer is the profile configuration to a parabola. The application of the refractive index profile to the following equation gave the coefficient values mentioned below.

| $N(r) = N0 - N1 \cdot r^2 + N2 \cdot r^4$ | | |
| --- | --- | --- |
| N0 | N1 | N2 |
| 1. 10° C. methanol 1.7681 | $-4.0749 \times 10^{-3}$ | $-4.322 \times 10^{-4}$ |
| 2. 30° C. methanol 1.7688 | $-5.8294 \times 10^{-3}$ | $-1.296 \times 10^{-4}$ |
| 3. 50° C. methanol 1.7695 | $-7.1998 \times 10^{-3}$ | $8.590 \times 10^{-5}$ |

Example 5

Figure 6:
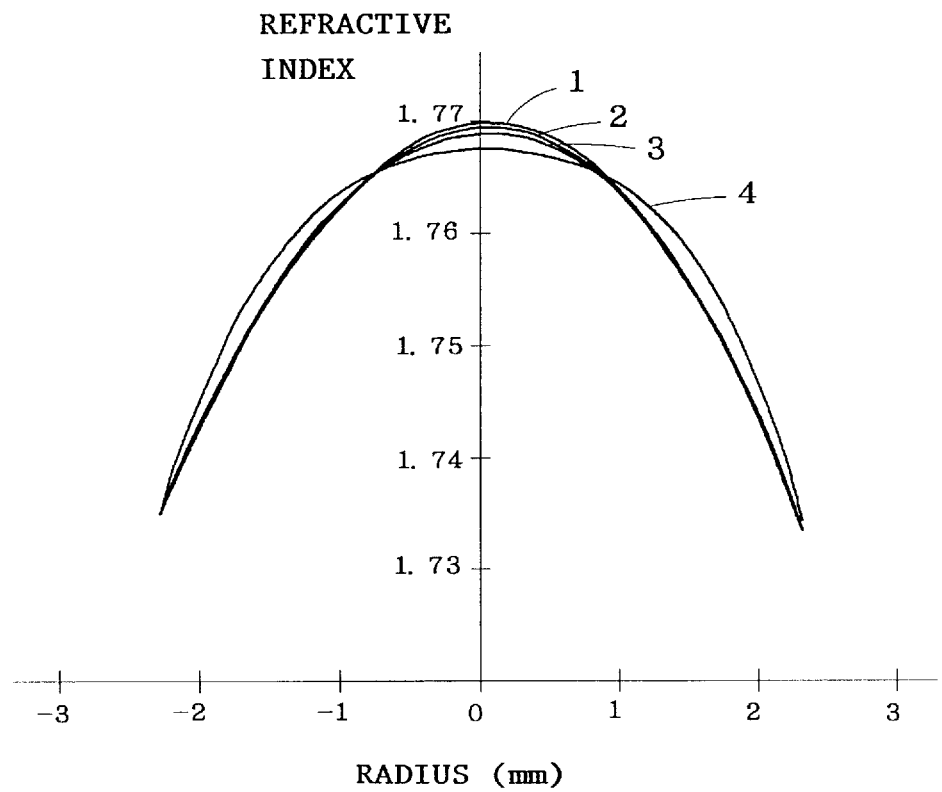
FIG. 6 illustrates refractive index profile configurations of gradient index optical elements obtained according to still further examples of the invention.

A gel was prepared as in Example 4, treated as in Example 4 to impart a concentration profile thereto, and then dipped at 30° C. in the following solvents to stop the formation of the concentration profile, thereby fixing a concentration profile configuration.
1. Diethyl ether
2. Acetone
3. Methanol
4. Normal-butanol After the fixation of the concentration profile, the gel was dried, and heated in an electric furnace into a glass, thereby obtaining a gradient index optical element. The results of measurement of diametrical refractive index profiles of the obtained gradient index optical elements are shown in FIG. 6. The viscosity of the profile-fixing solutions increases in the order of 1 to 4. The gels treated with diethyl ether, and acetone, both being the treating solutions having a lower viscosity, provided gradient index optical elements having a substantially parabolic configuration of refractive index profile. The gels treated with methanol, and n-butanol, on the other hand, provided gradient index optical elements having a deformed, or centrally depressed, configuration of profile.

The application of the refractive index profile to the following equation gave the coefficient values mentioned below.

| $N(r) = N0 - N1 \cdot r^2 + N2 \cdot r^4$ | | |
| --- | --- | --- |
| N0 | N1 | N2 |
| 1. Diethyl ether 1.7698 | $-6.7637 \times 10^{-3}$ | $8.250 \times 10^{-7}$ |
| 2. Acetone 1.7694 | $-6.6444 \times 10^{-3}$ | $-9.459 \times 10^{-6}$ |
| 3. Methanol 1.7688 | $-5.8249 \times 10^{-3}$ | $-1.296 \times 10^{-4}$ |
| 4. Normal-butanol 1.7675 | $-2.9440 \times 10^{-3}$ | $-6.130 \times 10^{-4}$ |

Example 6

Thirteen (13) grams of IN hydrochloric acid were mixed with a mixture of 42 g of silicon tetramethoxide and 30 g of ethanol for partial hydrolysis which in turn yielded a sol. The sol was stirred for 10 minutes in a solution of 20 g of barium acetate in 55 g of water, to which 37.4 g of acetic acid were added. The sol was cast in a cylindrical vessel, and allowed to stand alone at 30° C. for gelling, which yielded a rod-like gel of 7.4 mm in diameter. The gel was dipped in a 0.25M solution of barium acetate in water and isopropanol, and then in ethanol to precipitate barium acetate crystallites in the gel. Subsequently, the gel was dipped for 25 hours in a 0.2 mol/l solution of potassium acetate in methanol:acetone=70:30, to thereby impart a concentration profile to the barium component in the gel. It is here to be noted that the solubility of barium acetate in the solution consisting of methanol:acetone=70:30 was $1.58\times10^{-3}$ mol/l, and that the diffusion coefficient of barium was then $2.28\times10^{-7}$ cm$^2$/sec.

After this, the gel was dipped in acetone to fix the profile, and then dried and fired into a transparent gradient index optical element. The measurement of a diametrical refractive index profile configuration of the glass upon polished into a parallel-plate shape indicated that the glass has a substantially parabolic configuration of refractive index profile, as represented by $$n(r)=n_0+n_{10}r^2+n_{20}r^4 \quad (4)$$

where $n_0=1.6482$, $n_{10}=-1.5152\times10^{-3}$, and $n_{20}=8.5041\times10^{-5}$.

Comparative Example 3

Ten (10) gel rods prepared as in Example 6 were dipped in a 0.25M solution of barium acetate in water and isopropanol, and then in ethanol to precipitate barium acetate crystallites in the gel.

Then, the gel rods were dipped in a 0.2 mol/l solution of potassium acetate in methanol for 11 dipping periods of time changing from 3 hours to 13 hours with an increment of 1 hour. It is here to be noted that the solubility of barium acetate in methanol was $1.06\times10^{-2}$ mol/l, and that the diffusion coefficient of barium was then $8.3\times10^{-7}$ cm$^2$/sec. After this, the gel rods were dipped in acetone to fix the concentration profiles, and then dried and fired into transparent gradient index optical elements.

These glasses were polished into a parallel-plate shape, and measured in terms of their diametrical refractive index profile configurations. In all these glasses, the values of $n_{20}$ in equation (4) are negative, and large in terms of absolute value, and the central refractive indices are lower than that of a parabola. Thus, these glasses have only limited applications in view of optical design.

Example 7

Fifty (50) grams of 0.01N hydrochloric acid were mixed with a mixture of 48 g of silicon tetramethoxide and 42 g of silicon tetraethoxide for partial hydrolysis which in turn yielded a sol. The sol was stirred for 10 minutes in a solution of 54 g of lead acetate in 92 g of water, to which 33.2 g of acetic acid were added. The sol was cast in a cylindrical vessel, and allowed to stand alone at 30° C. for gelling, which yielded a rod-like gel of 31 mm in diameter. The gel was dipped in a 0.43M solution of lead acetate in water and isopropanol, and then in isopropanol:acetone=50:50, 30:70, and 0/100 (by volume) in the described order to precipitate lead acetate crystallites in the gel. Then, the gel was dipped for 52 hours in a 0.3 mol/l solution of potassium acetate in ethanol:acetone=40:60, thereby imparting a concentration profile to the lead component in the gel. It is here to be noted that the solubility of lead acetate in this solution was $1.25\times10^{-3}$ mol/l. After this, the gel was dipped in acetone to fix the profile, and then dried and fired into a transparent gradient index optical element. The measurement of a diametrical refractive index profile configuration of the glass upon polished into a parallel-plate shape indicated that the glass has a substantially parabolic configuration of refractive index profile, as represented by $$n(r)=n_0+n_{10}r^2+n_{20}r^4$$

where $n_0=1.6759$, $n_{10}=-2.1382\times10^{-3}$, and $n_{20}=4.5210\times10^{-5}$.

Example 8

Fifteen (15) grams of IN hydrochloric acid were mixed with a mixture of 42 g of silicon tetramethoxide and 30 g of ethanol for partial hydrolysis which in turn yielded a sol. The sol was stirred for 10 minutes in a solution of 11.2 g of barium acetate and 7.1 g of lanthanum acetate in 70 g of water, to which 18.4 g of acetic acid were added. The sol was cast in a cylindrical vessel, and allowed to stand alone at 30° C. for gelling, which yielded a rod-like gel of 5.6 mm in diameter. The gel was dipped in a solution of 0.1M lanthanum acetate and 0.2M barium acetate in water and ethylene glycol, and then in a mixed solution of methanol and ethanol to precipitate crystallites of barium acetate and lanthanum acetate in the gel.

Then, the gel was dipped for 36 hours in a 0.15 mol/l solution of potassium acetate in methanol:ether:ethylene glycol=60:20:20, thereby imparting concentration profiles to the barium and lanthanum components in the gel. After this, the gel was dipped in acetone to fix the profiles, and then dried and fired into a transparent gradient index optical element. The measurement of a diametrical refractive index profile configuration of the glass upon polished into a parallel-plate shape indicated that the glass has a substantially parabolic configuration of refractive index profile, as represented by $$n(r)=n_0+n_{10}r^2+n_{20}r^4$$

where $n_0=1.6928$, $n_{10}=-5.0219\times10^{-3}$, and $n_{20}=9.2895\times10^{-5}$.

Example 9

Thirty-six (36) grams of 0.02 mol/l hydrochloric acid ere stirred with a solution prepared by adding 49 g of n-propanol to 125.8 g of tetramethoxysilane for 45 minutes, and added to the resulting solution was a solution obtained by mixing together 51.36 g of Ti(On-C$_4$H$_9$)$_4$ and 25 g of butanol, followed by a 10-minute stirring. Added to the resulting solution was 0.02 mol/l of ammonia water for hydrolysis which in turn yielded a sol. The sol was then cast in cylindrical vessels of 28 mm in inner diameter for gelling. Half of the gel products were dipped for 132 hours in a water-methanol solution containing 0.008 M hydrochloric acid to impart concentration profiles thereto. At this time, the diffusion coefficient D of titanium was $4.2\times10^{-7}$ cm$^2$/sec. After this, the gel products were dipped in butanol to wash away hydrochloric acid from within the gels, thereby stopping the formation of the concentration profiles.

Each gel was dried, and sintered into a transparent gradient index glass rod. The measurement of a diametrical refractive index profile of the glass rod upon polished into a parallel-plate shape indicated that the glass rod has a substantially parabolic configuration of refractive index profile.

Comparative Example 4

A gel prepared as in Example 9 was dipped in an aqueous solution containing 0.1M hydrochloric acid to impart a concentration profile thereto. At this time, the diffusion coefficient D of titanium was $8.1\times10^{-7}$ cm$^2$/sec. Whereupon, the gel was dipped in methanol to wash away hydrochloric acid from within the gel, thereby stopping the formation of the concentration profile. This gel was dried, and sintered into a transparent gradient index glass rod. The measurement of a diametrical refractive index profile of the glass rod upon polished into a parallel-plate shape indicated that the central refractive index thereof is slightly lower as compared with a parabola, or showed that the glass rod has only limited applications in view of optical design.

Example 10

Thirteen (13) grams of 1N hydrochloric acid were mixed with a mixture of 42 g of silicon tetramethoxide and 25 g of ethanol for partial hydrolysis which in turn yielded a sol. The sol was stirred for 10 minutes in a solution of 20.1 g of barium acetate and 11.8 g of yttrium acetate in 73 g of water, to which 32 g of acetic acid were added. The sol was cast in a cylindrical vessel, and allowed to stand alone at 30° C. for gelling, which yielded a rod-like gel of 20 mm in diameter. The gel was dipped in a solution of 0.05M yttrium acetate and 0.1M barium acetate in water and isopropanol, and then in a mixed solution of methanol and ethanol to precipitate crystallites of barium acetate and yttrium acetate in the gel.

Then, the gel was dipped for 58 hours in a solution consisting of methanol, acetone and hexane at a 70:10:20 ratio and further containing 0.10 mol/l of potassium acetate and 0.10 mol/l of sodium lactate while said solution was kept at 25° C., thereby imparting concentration profiles to the barium and yttrium components in the gel. At this time, the diffusion coefficients D of barium and yttrium were $9.2 \times^{-9}$ cm$^2$/sec. and $4.5 \times 10^{-9}$ cm$^2$/sec., respectively. After this, the gel was dipped in acetone maintained at 45° C. to fix the profiles, and then dried and fired into a transparent gradient index optical element. The measurement of a diametrical refractive index profile configuration of the glass upon polished into a parallel-plate shape indicated that the glass has a substantially parabolic configuration of refractive index profile.

Example 11

A gel prepared as in Example 7 was dipped in a water-isopropanol solution containing 0.43M lead acetate, and then in isopropanol:acetone=50:50, 30:70, and 0:100 (by volume) in the described order to precipitate lead acetate crystallites in the gel. Then, the gel was dipped for 46 hours in an ethanol solution maintained at 10° C. and containing 0.15 mol/l of potassium acetate, thereby imparting a concentration profile to the lead component in the gel. After this, the gel was dipped in acetone at 25° C. to fix the concentration profile, dried, and fired into a transparent gradient index optical element. The measurement of a diametrical refractive index profile of the glass upon polished into a parallel-plate shape indicated that the glass has a substantially parabolic configuration of refractive index profile, as represented by $$n(r) = n_0 + n_{10} r^2 + n_{20} r^4$$

where $n_0 = 1.6715$, $n_{10} = -1.1652 \times 10^{-3}$, and $n_{20} = 2.3861 \times 10^{-6}$.

According to the present invention, profile configurations of gradient index glasses usable as lenses for cameras, microscopes, endoscopes, etc. can be placed under precise control, so that a substantially parabolic configuration of profiles greatly favorable in view of optical design can be achieved.

What we claim is:

1. A process for making a gradient index optical element which comprises steps of:
    preparing a gel by a sol-gel technique,
    forming a concentration profile of a metal component across the obtained gel, and
    fixing the formed concentration profile of the metal component by dipping the gel in a concentration profile-fixing solution, and wherein:
        a concentration profile-fixing rate of diffusion of the concentration profile-fixing solution in the gel at the step of fixing the concentration profile of the metal component is higher than a concentration profile-forming rate of diffusion of the metal component at the step of forming said concentration profile.

2. The process for making a gradient index optical element according to claim 1, wherein the step of forming the concentration profile includes a treatment for dipping the gel in a concentration profile-imparting solution, and the step of fixing the concentration profile includes a treatment for dipping the gel in a concentration profile-fixing solution, and wherein a rate of diffusion of the concentration profile-fixing solution in the gel is higher than a rate of diffusion of the concentration profile-imparting solution in the gel.

3. The process for making a gradient index optical element according to claim 1, wherein the step of forming the concentration profile includes a treatment for dipping the gel in a concentration profile-imparting solution, and the step of fixing the concentration profile includes a treatment for dipping the gel in a concentration profile-fixing solution, and wherein a temperature of the concentration profile-fixing solution is higher than a temperature of the concentration profile-imparting solution.

4. The process for making a gradient index optical element according to claim 3, wherein the treatment for dipping the gel in the concentration profile-fixing solution is carried out under pressure at a temperature that is higher than a boiling point of the concentration profile-fixing solution under atmospheric pressure but at a temperature at which the concentration profile-fixing solution does not boil.

5. The process for making a gradient index optical element according to claim 3, wherein the temperature of the concentration profile-imparting solution lies within a range of −23° C. to 17° C. inclusive.

6. The process for making a gradient index optical element according to claim 1, wherein the step of forming the concentration profile includes a treatment for dipping the gel in a concentration profile-imparting solution, and the step of fixing the concentration profile includes a treatment for dipping the gel in a concentration profile-fixing solution, and wherein a viscosity of the concentration profile-fixing solution is lower than a viscosity of the concentration profile-imparting solution.

7. The process for making a gradient index optical element according to claim 6, wherein the viscosity of the concentration profile-imparting solution is greater than 0.5 cP, and the viscosity of the concentration profile-fixing solution is lower than 0.5 cP.

8. The process for making a gradient index optical element according to claim 7, wherein the concentration profile-imparting solution contains at least one selected from the group consisting of an alcohol, a glycol, and water, and the concentration profile-fixing solution contains at least one selected from the group consisting of a ketone, an ether, a saturated hydrocarbon, and an ester.

9. The process for making a gradient index optical element according to claim 1, wherein the concentration profile-forming rate is varied such that the concentration profile-forming rate is high at a time when dipping of the gel in a concentration profile-imparting solution is initiated, and the concentration profile-forming rate is low at a time before the completion of the dipping of the gel in the concentration profile-imparting solution.

10. A process for making a gradient index optical element which comprises steps of:
    preparing a gel by a sol-gel technique,
    dipping the obtained gel in an acid or metal salt-containing solution to form a concentration profile of a metal component across the gel, and
    fixing the formed concentration profile of the metal component by dipping the gel in a concentration profile-fixing solution, wherein:

at the step of forming the concentration profile of the metal component a diffusion coefficient in the gel of the metal component contained in the gel is up to $5 \times 10^{-7}$ cm$^2$/sec.

11. The process for making a gradient index optical element according to claim 10, wherein at the concentration profile-imparting step a first concentration profile-imparting solution in which the metal component is diffused at a first rate is replaced by a second concentration profile-imparting solution in which the metal component is diffused at a second rate;

wherein said first rate is higher than said second rate.

12. The process for making a gradient index optical element according to claim 10, wherein at the gel preparation step the gel is prepared using a silicon alkoxide and at least one metal salt as starting materials, and a concentration profile-imparting solution contains at least one selected from the group consisting of an organic solvent, and water.

13. The process for making a gradient index optical element according to claim 12, wherein the organic solvent is at least one selected from the group consisting of an alcohol, a glycol, a saturated hydrocarbon, an ether, a ketone, and an ester.

14. The process for making a gradient index optical element according to claim 10, wherein at the step of forming the concentration profile of the metal component a diffusion coefficient in the gel of the metal component contained in the gel lies within a range of $1 \times 10^{-9}$ cm$^2$/sec. $-5 \times 10^{-7}$ cm$^2$/sec.

15. The process for making a gradient index optical element according to claim 10, wherein at the step of forming the concentration profile of the metal component a diffusion coefficient in the gel of the metal component contained in the gel lies within a range of $1 \times 10^{-8}$ cm$^2$/sec. $-5 \times 10^{-7}$ cm$^2$/sec.

16. A process for making a gradient index optical element which comprises steps of:

preparing a gel by a sol-gel technique, dipping the gel in a given liquid to form a concentration profile of a metal component across the gel, and fixing the formed concentration profile of the metal component by dipping the gel into a concentration profile-fixing solution, wherein:

at the step of forming the concentration profile a solubility of the metal component contained in the gel with respect to a liquid in which the gel is dipped is in a range of $1 \times 10^{-4}$ mol/l to $5 \times 10^{-3}$ mol/l.

17. The process for making a gradient index optical element according to claim 16, wherein at the gel preparation step the gel is prepared using a silicon alkoxide and at least one metal salt as starting materials, and a concentration profile-imparting solution contains at least one selected from the group consisting of an organic solvent, and water.

18. The process for making a gradient index optical element according to claim 17, wherein the organic solvent is at least one selected from the group consisting of an alcohol, a glycol, a saturated hydrocarbon, an ether, a ketone, and an ester.

19. The process for making a gradient index optical element according to claim 16, wherein at the step of forming the concentration profile a solubility of the metal component contained in the gel with respect to the liquid in which the gel is dipped is in a range of $2 \times 10^{-4}$ mol/l to $3.2 \times 10^{-3}$ mol/l.

20. The process for making a gradient index optical element according to claim 16, wherein at the step of forming the concentration profile a solubility of the metal component contained in the gel with respect to the liquid in which the gel is dipped is in a range of $5 \times 10^{-4}$ mol/l to $2.8 \times 10^{-3}$ mol/l.

21. The process for making a gradient index optical element according to claim 16, wherein at a concentration profile-imparting step a first concentration profile-imparting solution in which the metal component has a first solubility is replaced by a second concentration profile-imparting solution in which the metal component has a second solubility;

wherein said first solubility is higher than said second solubility.

* * * * *